June 26, 1951  E. B. HALES  2,558,358
TIMING METHOD
Filed Nov. 27, 1945
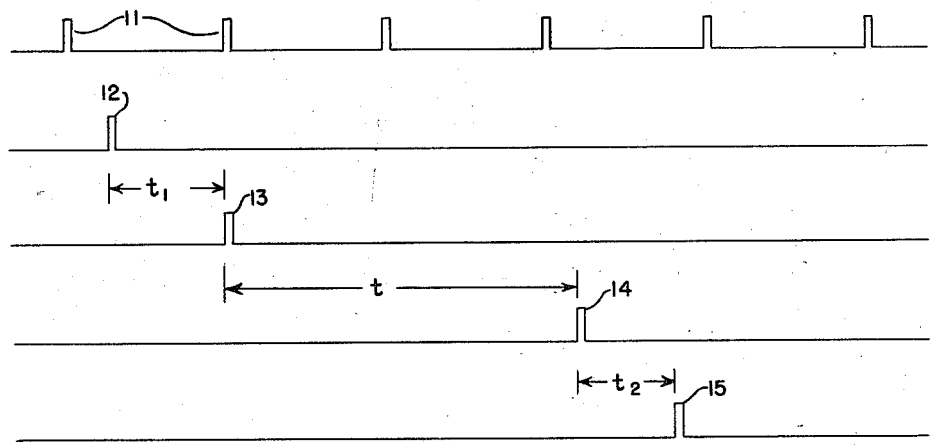
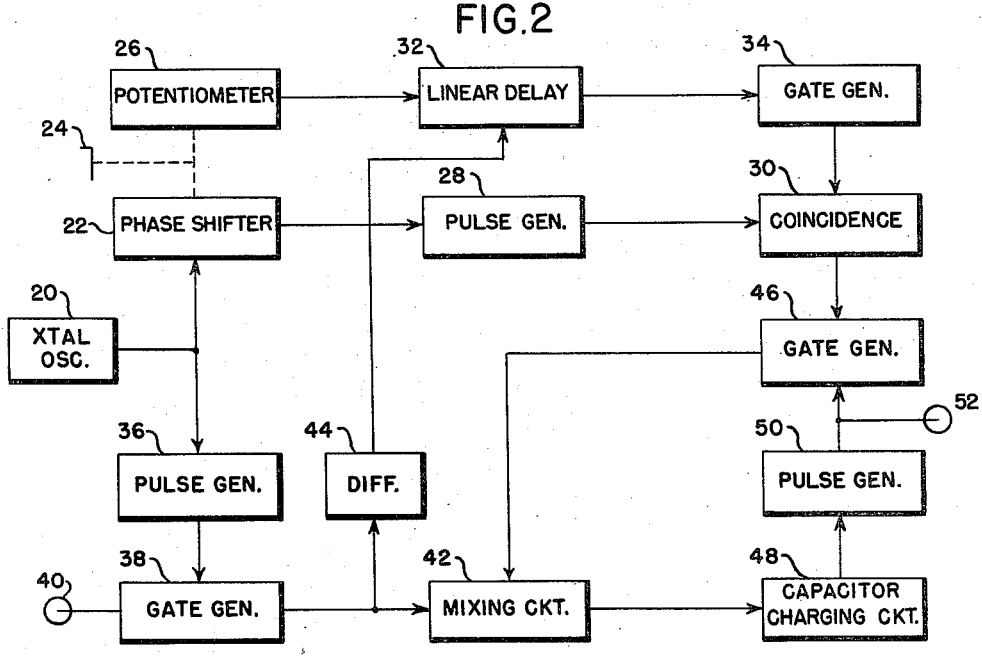
INVENTOR.
EVERETT B. HALES
BY
William D. Hall.
ATTORNEY Patented June 26, 1951

2,558,358

UNITED STATES PATENT OFFICE 2,558,358

TIMING METHOD

Everett B. Hales, Cambridge, Mass., assignor, by mesne assignments, to the United States of America as represented by the Secretary of War Application November 27, 1945, Serial No. 631,170

5 Claims. (Cl. 250—27)

This invention relates to pulse-timing apparatus and more particularly to a method of, and means for, the precise generation of voltage pulses.

According to conventional practice, it is customary in radar or radio object-locating systems to provide range marks on the cathode ray tube indicator. These range marks are produced by voltage pulses normally applied to the intensity grid or to the cathode of the indicator tube. The range marks may, in some cases, be fixed in position on the indicator and located to represent equal intervals, such as every ten miles. Systems employing fixed range marks are generally used for long range searching purposes, wherein extreme range accuracy is not essential. Other systems employ a single range mark, the position of which may be altered to intersect any desired target indication. Associated with the mechanism for adjusting the marker position, there is normally some indicator which gives the range of the marker, and thereby of the target when the target indication and marker intersect. Since the speed of electromagnetic energy is extremely high, 10.74 microseconds per loop mile, it is imperative for accurate range determination that the time interval between the time of occurrence of the transmitted signal and the time of occurrence of the range marker be precisely determined and controlled.

Many radar systems employ crystal controlled timing of the transmitted signals. This insures that the time interval between successive transmitted signals is always exactly the same. In a system of this nature, range marker voltage pulses may be generated by squaring and peaking a sine wave voltage which initially originates at or is controlled by the crystal oscillator, and the position of the range marker pulse may be varied by use of a very accurate phase shifter. In many other radar systems, however, the time of transmission is less stably controlled by conventional oscillators not using crystals or by rotary spark gaps. Any of these latter methods of less stably controlling the time of transmission from the system will lead to unequal time intervals between transmitted signals. The problem of generating a range marker pulse a precise predetermined time interval after the transmitted signal is generally, therefore, made difficult because of the uncertainty of the time of occurrence of the transmitted signal.

It is also often desirable, in radar systems which do or do not employ crystal control of the timing and repetition rate of the transmitted signals, to have some means whereby the calibration of the range marks of that system may be checked.

As is well understood in the art, there are many other applications of pulse techniques wherein it is desirable to generate a second voltage pulse at a precise predetermined time after a first voltage pulse, the first voltage pulse having a repetition rate which may be unstable.

It is an object of the present invention, therefore, to provide a method for producing a second voltage pulse a precise time interval after the occurrence of a first voltage pulse whose repetition rate may not be stable.

It is a further object of the present invention to provide an electrical circuit for generating a second voltage pulse a predetermined time interval after a first voltage pulse having a repetition rate which may vary.

It is a still further object of the present invention to provide an apparatus which may be used to calibrate the range mark or marks on a radar system indicator.

For a better understanding of the invention, together with other and further objects thereof, reference is had to the following description taken in connection with the accompanying drawing in which:

Fig. 1 illustrates a series of voltage waveforms which illustrate the basic method of operation of the persent invention, and Fig. 2 is a block diagram of one circuit embodiment of the present invention.

Referring now to the drawing, and more particularly to Fig. 1 thereof, several graphs of pulses are shown drawn to the same time scale. The series of pulses 11 have a repetition rate which is very accurately controlled. For example, pulses 11 may be derived from a sine wave voltage generated by a very stable crystal oscillator, thus serving to define uniform intervals of time. The voltage pulse 12 is one of a series having a repetition rate which may be unstable. The pulse 12 may, for example, represent one of the transmitted signals from a radar system which employs rotary spark gap modulation or any other type of modulation which is relatively unstable. The time of occurrence of successive pulses 12, hereinafter termed initial pulses, may thus vary relative to instants which would be defined by stably produced pulses. In the described embodiment, the repetition period of pulses 11 is much shorter than that of initial pulses 12, for reasons which will become apparent hereinafter.

Each pulse 12 is followed by a pulse 13 which occurs at an instant coinciding with the instant at which the pulse 12 is followed by a pulse 11. The time interval between pulse 12 and pulse 13 is designated $t_1$. Time interval $t_1$ may vary because of the non-uniform repetition periods of pulses 12, and because the repetition frequency of pulses 11 is not necessarily an exact multiple of the repetition frequency of pulses 12. Pulse 14 occurs at a time $t$ after the voltage pulse 13. The time interval $t$ is preferably made variable as in the described embodiment and is accurately known. Whether or not the time interval $t$ is to be variable will depend upon whether or not it is desired that the time interval between an initial voltage pulse 12 and a final voltage pulse is to be fixed or variable at will. Each voltage pulse 15, hereinafter termed a final pulse, is generated a time interval $t_2$ after the time of generation of a corresponding voltage pulse 14.

Briefly restated, an initial pulse 12, in a radar system, represents the time of occurrence of a transmitted signal and a corresponding final pulse 15 represents the time of occurrence of a range marking pulse; the range marker or final pulse 15 may be generated a fixed or variable time after the occurrence of an initial pulse 12 depending upon whether the time interval $t$, between voltage pulses 13 and 14, is fixed or variable. As before stated, the time interval $t$ is known. The time of occurrence of an initial pulse 12 relative to a corrsponding voltage pulse 11 is not fixed, and the time interval $t_1$ is, therefore, not a known quantity. Similarly, the time interval $t_2$ between a pulse 14 and a corresponding pulse 15 is not a known quantity. As will appear hereinafter, however, the total interval between the time of occurrence of an initial pulse 12 and the time of occurrence of a corresponding final pulse 15 is determined, making unnecessary the separate evaluation of intervals $t_1$ and $t_2$. Therefore, the time interval between the initial and final pulses is accurately known since this total time interval is the known time interval $t$ plus the known sum of the time intervals $t_1$ and $t_2$.

Fig. 2 illustrates one circuit embodiment of the invention in which final pulses are accurately generated at any chosen interval after occurrence of corresponding initial pulses. A crystal oscillator 20 or other highly stable source of sinusoidal signals is electrically connected to a phase shifter 22. The phase shifter 22 may be any one of several well known in the art, such as the Helmholtz-coil phase shifter, which will provide a continuously variable phase shift in the signal applied to it from oscillator 20. The amount of phase shift may be accurately determined from an indicator associated with the phase shifter. The phase shift introduced by phase shifter 22 may be controlled by a handwheel 24 which is also mechanically connected, for example by gearing, to the control element of a potentiometer circuit 26. The output of phase shifter 22 is electrically connected to a pulse generator 28. The pulse generator 28 may be any generator well known in the art capable of providing a voltage pulse from, and fixed in phase relative to, a sinusoidal voltage. The pulse generator 28 may, for example, comprise overdriven amplifiers, and a peaking circuit or a blocking oscillator. The output of the pulse generator 28 is electrically connected to a coincidence circuit 30. The coincidence circuit 30 may be any one of several well known in the art which provides an output signal upon the coincident application of two or more input signals and may, for example, comprise a multi-electrode vacuum tube which is maintained nonconducting in the absence of two or more coincident signals applied to two or more control elements thereof. The output of the potentiometer circuit 26 is a D.-C. potential which is proportional to the phase shift introduced by phase shifter 22, and is applied as a control voltage to a linear delay circuit 32. The linear delay circuit 32 may be any circuit well known in the art capable of producing an output pulse a certain time interval after an initiating pulse, which time interval is proportional to a D.-C. control potential. For example, the linear delay circuit 32 may be of the delay multivibrator type. The output pulses of the delay circuit 32 are applied as triggering signals to a gate generator 34. The gate generator 34 produces a substantially rectangular voltage pulse output upon incidence of a triggering signal, and may, for example, be any one of the so called one-shot, flip-flop, or delay multivibrators which are well known in the art. The output of the gate generator 34 is applied to the coincidence circuit 30.

The output of crystal oscillator 20 is also connected to a pulse generator 36, which may be of a type similar to the pulse generator 28. The output of pulse generator 36 is electrically connected to a gate generator 38. A terminal 40 of gate generator 38 is the input terminal at which the initial voltage pulses, e. g. a series of pulses 12 such as indicated in Fig. 1, are applied from a source (not shown). The gate generator 38 may be any type of generator capable of producing a substantially rectangular voltage pulse, the time of initiation of which is determined by one voltage pulse and the end of which is determined by a second voltage pulse. For example, the gate generator 38 may be a circuit of the Eccles-Jordan type. Such circuits are well known in the art, an example being shown in Figs. 4–7, page 173 of "Ultra High Frequency Techniques" by J. G. Brainerd et al., published in 1942 by D. Van Nostrand Co., Inc. In this instance the output voltage pulse is initiated by the initial pulse, pulse 12, Fig. 1, and the output pulse is terminated by the next occurring voltage pulse of the stable series, pulse 11, Fig. 1, generated by the pulse generator 36 indicated in Fig. 2. The output from the gate generator 38 is connected to a mixing circuit 42 and to a differentiating circuit 44. The mixing circuit 42 may be any conventional electronic mixing circuit which provides from two isolated inputs a common output signal. For example, it may well comprise two vacuum tube amplifier tubes which employ a common plate load. The differentiator 44 may be any circuit capable of producing a short, sharp pulse coinciding in time with the termination of a rectangular input pulse. For example, it may be a short time constant RC or RL circuit. The output of the differentiator 44 is connected to and initiates the operation of the linear delay circuit 32. The output of differentiator 44 will be the voltage pulse 13, Fig. 1. The output of the coincidence circuit 30, voltage pulse 14 of Fig. 1, is connected to and initiates operation of a gate generator 46. The gate generator 46 may be similar to the gate generator 38. The output of the gate generator 46 is substantially rectangular in waveform and is applied to the mixing circuit 42. The output of the mixing circuit 42 is connected to a capacitor charging circuit 48. The capacitor charging circuit may be any circuit which is capable of charging a capacitor by an amount which is a function of the time of charge. For example, the capacitor charging circuit 48 may be a conventional sawtooth generator so arranged that the time during which the capacitor charges is determined by the output of the mixing circuit 42, and which is further arranged so that the capacitor is cumulatively charged during distinct pulses during each cycle of the mixing circuit 42. The output of the capacitor charging circuit 48 is connected to a pulse generator 50. The pulse generating circuit 50 may be any device such as a blocking oscillator which will generate an output voltage pulse when a control voltage, in this instance the voltage developed across the capacitor of charging circuit 48, reaches a predetermined value. The output of the pulse generator 50 is connected to, and terminates the output of, the gate generator 46. The output of the pulse generator 50 is also connected to a terminal 52 at which the voltage pulse 15, Fig. 1, is available for use as desired.

In the operation of the circuit of Fig. 2, the oscillator 20 provides a highly stable sinusoidal voltage from which the pulse generator 36 provides a series of precisely and equally spaced voltage pulses 11, indicated in Fig. 1. These pulses are applied to the gate generator 38. Also applied to the gate generator 38 are the initial pulses 12, Fig. 1, the repetition rate of which may not be stable. The gate generator 38 is so arranged that the input at its terminal 40, pulse 12 of Fig. 1, initiates a rectangular voltage pulse. This rectangular voltage pulse is terminated by the next occurring voltage pulse of series 11. The length of this rectangular voltage pulse is thus precisely equal to the time interval $t_1$, Fig. 1. The trailing edge of this rectangular voltage output is differentiated by the differentiator 44 to produce the pulse 13, Fig. 1. The output of the oscillator 20 is also passed through the phase shifter 22 to the pulse generator 28 which produces a series of voltage pulses (not shown) whose time-positions may, by means of phase shifter 22, be continuously shifted relative to the series of pulses 11. These shifted pulses are applied to the coincidence circuit 30. The same handwheel 24 which determines the amount of phase shift introduced by the phase shifter 22 is mechanically connected to the control element of potentiometer circuit 26 which thus provides a D.-C. voltage output proportional to the phase shift. The output of the differentiator 44, pulse 13 of Fig. 1, initiates operation of the linear delay circuit 32 which, after a length of time determined by the control element setting of the potentiometer circuit 26, produces and applies a voltage pulse to the gate generator 34. The gate generator 34 in turn produces a rectangular voltage pulse, whose time-length is greater than the time-length of a shifted pulse, but less than the time interval between shifted pulses. The rectangular voltage pulse developed by gate generator 34 thus embraces, in time occurrence, only one of the shifted pulses from pulse generator 28. The output of the coincidence circuit 30 will, therefore, be one of the series of shifted voltage pulses. This selected voltage pulse may, if desired, be one which is shifted in time through more than one period of the pulse series 11, as selected by the setting of the potentiometer circuit control element and by the corresponding time-position of the voltage pulse provided by gate generator 34. The output pulse from the coincidence circuit 30, corresponding in time-position to the selected shifted pulse, initiates operation of the gate generator 46. The output of gate generator 46 is a substantially rectangular voltage which is automatically terminated as will appear.

The output of the gate generator 38 and of the gate generator 46 are applied to the mixing circuit 42. The common output signal of the latter circuit, comprising a voltage gate of unknown duration $t_1$ measured from the instant of occurrence of an initial pulse 12, followed, after a known interval $t$, by a voltage gate corresponding to that developed by gate generator 46, is applied to charging circuit 48. The capacitor in the capacitor charging circuit 48 will first charge an amount which is determined by the length of the first voltage gate and hence an amount proportional to $t_1$. During the time interval of length $t$ there is no output pulse from the mixing circuit 42, and during this time the charge on the capacitor in the capacitor charging circuit 48 will not change. At the beginning of the later rectangular voltage pulse corresponding to that from generator 46, the capacitor will begin to increase its charge. The length of time during which the capacitor will continue to charge will depend upon the value of the critical control voltage of the pulse generator 50. When this critical voltage develops across the capacitor, generator 50 generates a pulse 15; and the capacitor is returned to its initial uncharged state. The pulse 15 is applied to gate generator 46 and terminates its output voltage. The length of the gate from the generator 46 is thus automatically controlled to be equal to the time interval $t_2$, Fig. 1.

Since the critical control voltage of the pulse generator 50 is fixed, and since the charge which will be added to the capacitor depends only upon the length of time during which charge is added, it will be seen that the time interval $t_2$ is automatically obtained in such manner that the sum of the two time intervals $t_1$ and $t_2$, Fig. 1, is constant. Each output pulse at terminal 52 (pulse 15, Fig. 1) thus occurs at a precise predetermined time interval after a corresponding initial pulse 12 even though the initial pulses 12 do not recur regularly.

While there has been described what is at present considered to be the preferred embodiment of the invention, it will be obvious to those skilled in the art that various changes and modifications may be made therein without departing from the scope of the invention.

What is claimed is:

1. In a method for producing a final series of pulses which are precisely spaced a predetermined amount in time after the times of occurrence of a first series of pulses whose repetition rate may not be stable, the steps including generating a second series of pulses having a fixed and accurately known repetition rate, generating a third series of pulses each of which is initiated at the time of occurrence of each of said first series of pulses and which is terminated at the time of occurrence of each next following pulse of said second series of pulses, generating each of a fourth series of pulses at a predetermined time interval after the termination of each of said third series of pulses, initiating the generating of each of a fifth series of pulses at the time of occurrence of said fourth series of pulses, and generating each of said final series of pulses when the sum of the time interval durations of each of said third series of pulses and said fifth series of pulses equals a known constant.

2. An electrical circuit for producing a final series of voltage pulses from an input of a first series of voltage pulses whose repetition rate may vary, said final pulses being produced at instants precisely spaced a predetermined amount after the times of occurrence of said first series of voltage pulses, said circuit comprising first pulse generating means for generating a series of voltage pulses whose repetition rate and times of occurrence are known and fixed, first gate generating means, means for applying said input of said first series of pulses and coupling said first pulse generating means to said first gate generating means for initiating the generation of a substantially rectangular first voltage gate in response to a pulse of said first series of voltage pulses and terminating the generation of said first voltage gate in response to a following pulse from said first pulse generating means, second pulse generating means for generating a series of voltage pulses at a given time interval relative to the times of occurrence of voltage pulses from said first pulse generating means, means for establishing a unidirectional voltage whose amplitude is proportional to said given time interval between corresponding pulses from said first and second pulse generating means, differentiating means connected to the output of said first gate generating means for producing a voltage pulse at the end of said first voltage gate, delay means coupled to said differentiating means and controlled by said unidirectional voltage means for producing a voltage pulse delayed with respect to the pulse from said differentiating means by an amount proportional to said unidirectional voltage, second gate generating means connected to the output of said delay means for initiating the generation of a substantially rectangular voltage gate in response to the application thereto of said delayed pulse, coincidence means connected to said second gate generating means and to said second pulse generating means for periodically providing an output pulse therefrom, third gate generating means for providing a substantially rectangular second voltage gate whose time of initiation is determined by an output pulse from said coincidence means, a circuit including a capacitor, means for cumulatively charging said capacitor by an amount determined by the lengths of corresponding first and second voltage gates, and third pulse generating means for generating a final voltage pulse when the charge on said capacitor reaches a predetermined value.

3. In a method for producing a final series of voltage pulses at instants precisely spaced a predetermined amount after the times of occurrence of a first series of voltage pulses whose repetition rate may not be stable, the steps including establishing at an unknown time interval after each pulse of said first series of voltage pulses a first reference instant, establishing a second reference instant at a predetermined time interval after each said first reference instant and generating the final series of voltage pulses at that time interval after said second reference instant which makes the sum of said unknown time interval between a pulse of said first series of voltage pulses and a following first reference instant and the time interval between a following second reference instant and a pulse of the final series a given constant.

4. A circuit for producing a final series of voltage pulses from an input of an initial series of voltage pulses having a repetition rate which may vary, a final pulse being produced a predetermined interval subsequent to the time of occurrence of an initial pulse, said circuit comprising a first pulse generator for producing a series of pulses having a fixed repetition rate, energy storage means for cumulatively storing electrical energy applied thereto, a second pulse generator coupled to said storage means for producing said final pulse when triggered by a given magnitude of energy from said storage means, means controlled by said first pulse generator and said input of said initial series of pulses for generating a pulse having first electrical energy proportional in magnitude to the time interval between the time of occurrence of any given initial pulse and the time of occurrence of the pulse produced by said first pulse generator next following said given initial pulse, means for applying said pulse of first electrical energy to said storage means, delay means coupled to said means for generating said pulse of first electrical energy for providing a predetermined time delay with respect to said pulse produced by said first pulse generator next following said given pulse, means coupled to said delay means for generating a pulse of second electrical energy proportional in magnitude to the time interval subsequent to said predetermined time delay, and means for applying the pulse of said second energy to said storage means, whereby said storage means triggers said second pulse generator when the sum of the pulses containing said first and second energies equals said given magnitude of energy.

5. An electrical control circuit for use with a normally inoperative energy translating means which is rendered operative by an electrical energy of a given magnitude being applied thereto, said control circuit comprising an electrical energy storage means for cumulatively storing electrical energies applied thereto, means for connecting said electrical energy storage means to said translating means, first and second means for generating respectively pulses of first and second energy having magnitudes which are respectively proportional to first and second unknown time intervals, means for applying said first and second energy pulses to said electrical energy storage means, whereby said translating means is rendered operative when the sum of the magnitudes of said first and second electrical energy pulses equals said given magnitude of electrical energy.

EVERETT B. HALES.

REFERENCES CITED

The following references are of record in the file of this patent:

UNITED STATES PATENTS

| Number | Name | Date |
| --- | --- | --- |
| 2,402,917 | Miller | June 25, 1946 |